(No Model.)
T. BAKER.
MECHANISM FOR CONVERTING PEDAL MOTION.
No. 525,309. Patented Aug. 28, 1894.
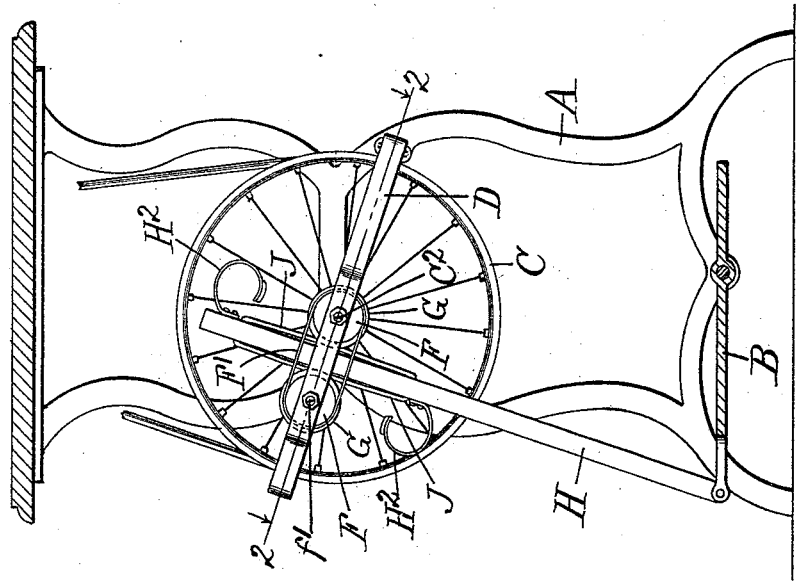
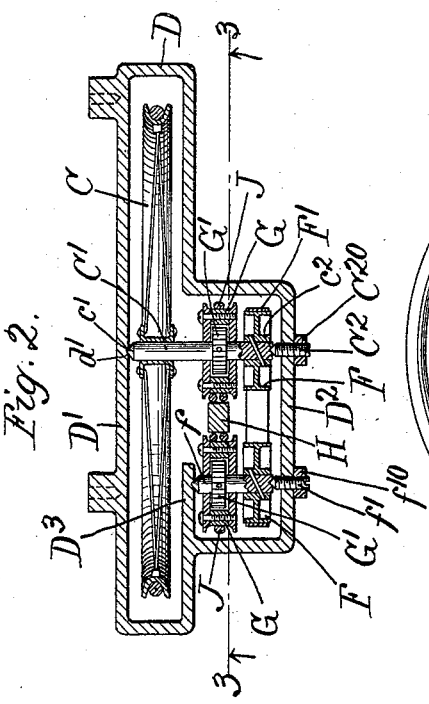
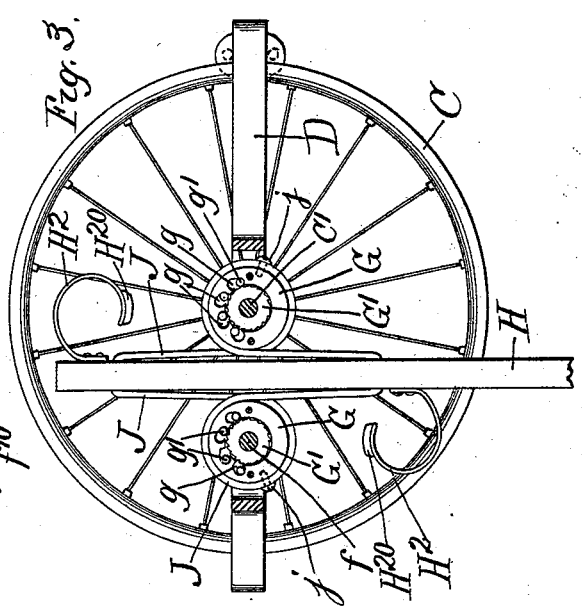
Witnesses.
E. T. Wray.
Jean Elliott
Inventor.
Thaddeus Baker
by Burton & Burton
his attys

---

UNITED STATES PATENT OFFICE.

THADDEUS BAKER, OF CHICAGO, ILLINOIS.

MECHANISM FOR CONVERTING PEDAL MOTION.

SPECIFICATION forming part of Letters Patent No. 525,309, dated August 28, 1894.

Application filed April 30, 1894. Serial No. 509,498. (No model.)

*To all whom it may concern:*

Be it known that I, THADDEUS BAKER, a citizen of the United States, residing at Chicago, county of Cook, and State of Illinois, have invented certain new and useful Improvements in Mechanism for Converting Pedal Motion, which are fully set forth in the following specification, reference being had to the accompanying drawings, forming a part thereof.

The purpose of this invention is to provide an improved mechanism for converting the motion of a rocking or oscillating pedal into rotary motion of a drive wheel for sewing machines and other light machinery; and it is applicable to the more general purpose of converting operating or reciprocating motion into rotary motion.

In the drawings:—Figure 1 is a side elevation of a standard and drive wheel having my improved mechanism connecting a pedal shown thereon with the drive wheel. Fig. 2 is a section at the plane indicated by the line 2—2 on Fig. 1. Fig. 3 is a detail section at the line 3—3 on Fig. 2.

A represents a standard upon which the mechanism is mounted.

B is the pedal.

C is the drive wheel.

D is a special frame in which the mechanism which constitutes my invention is mounted, said frame being adapted to be secured to the standard of any machine to which it is designed to apply the mechanism. I have designed it in the form shown in order that independently of the standard it may constitute a complete frame to support the mechanism, so that the entire device may be applicable to existing machines, which may have been originally constructed with common forms of drive wheels mounted on the standard, which drive wheels being removed and leaving the standards free, the independent frame which contains my mechanism may be readily attached to the standard.

The frame D consists substantially of a yoke encompassing the mechanism which is mounted in it, and having at its opposite sides bearings for the opposite ends of the shafts of said mechanism. This mechanism consists of the drive wheel C, called a drive wheel because it is the wheel which is to drive the machine to which the entire device is intended to be annexed, said wheel corresponding to the drive wheel usually mounted upon the standard, and driven by a pitman extending to the pedal. This wheel has the axle $C'$ rigid with it, terminating at one end in a conical point $c'$, which bears in a countersunk or conical seat provided at $d'$ upon the side-bar $D'$ of the frame D. For the other end of this shaft an adjustable bearing is provided the shape of the conical pointed screw $C^2$, which is set through the opposite side $D^2$ of the frame D, and enters a countersunk or conical seat $c^2$ in the end of the axle $C'$. A nut $C^{20}$ is provided on the screw $C^2$, jamming against the side-bar $D^2$ to retain the screw in adjusted position.

To afford bearing for a shaft of a clutch wheel hereinafter described, which is located so near the shaft of the wheel C that its own shaft would have to penetrate that wheel in order to obtain a bearing on the side-bar $D'$ of the frame D, a spur or short arm $D^3$ projects inside the plane of the drive wheel C a sufficient distance to afford a bearing for the inner end of this short shaft $f$, whose outer end is provided with an adjustable bearing on a conical pointed screw $f'$ set into the side-bar $D^2$, and provided with a jam-nut $f^{10}$.

On each of the shafts $C'$ and $f$ is a clutch device consisting of a ratchet disk $G'$, rigid with the shaft, and an encompassing case or box for the same which, exteriorly, is of the nature of a sheave or pulley or drum G, the interior cavity which receives the disk $G'$ being partly surrounded by oblique pockets $g\ g$, each containing a roller $g'$, adapted to engage with the teeth of the ratchet disk when they roll down the incline of the pockets, and adapted to be forced up the incline by the reverse or slipping movement of the ratchet disk. This specific form of clutch is not a part of my invention, and any suitable clutch mechanism may be employed at this place in my device. The two clutches are in the same plane parallel with the plane of the wheel C, and between them, in the same plane, the pitman H reciprocates, being connected at its lower end to the pedal B, and having cords, belts or cables J J, attached to it at both ends, and intermediately wound around the drums or pulleys G G, respectively.

The cables are secured at $j\ j$ to the sheaves or pulleys G G respectively, preferably at the point which are opposite the axle C' when the pitman is at the middle of its stroke, so that even if the cable encircles the drum but once, substantially a half turn may be given to the drum in each direction from that middle point of the pitman's stroke. The two clutch wheels are similarly constructed,—that is, they have their ratchets adapted to operate in the same direction, whereby they have opposite motion at their proximate sides toward the pitman, so that the stroke of the pitman in one direction rotates one and causes the drum to slip on the other ratchet disk, while the reverse stroke of the pitman rotates the one which slipped on the direct stroke and causes the other to slip. Thus, the rotary motion communicated to the shafts is in the same direction.

On each of the shafts C' and $f$, I mount rigidly a pulley F, these pulleys being of the same size and connected by a band F', encompassing them. By this means, the driving motion of the clutch on the shaft $f$, is communicated to the shaft C', so that that shaft is continuously driven either by one clutch or the other.

It will be understood that this mechanism is adapted to translate the oscillatory or rocking motion of the pedal into a continuous rotary motion of the drive wheel, whether the stroke of the pedal be long or short or of varying length; also, that when the cables encircle the drums once only, a full stroke of the pedal in each direction produces substantially one complete revolution of the drive wheel, so that two revolutions are produced by each complete oscillation of the pedal, if the full stroke is given at each movement. In order, however, that the operator may be relieved of the necessity of guarding against too long a stroke, which, when the cables encircle the drums but once, would tend to tear them from their fastenings on the drums, and also to waste power and time at each stroke, it is desirable that stops should be provided for the reciprocating motion of the pitman at the proper limit of the stroke in each direction. This may be conveniently done by providing abutments on the pitman which shall collide with the drums respectively at the limits of the stroke. If this stoppage were made positive, the danger of tearing loose the cables would be avoided, but the operator would experience difficulty in so accustoming himself to the precise length of the stroke as to avoid exerting unnecessary pressure at each stroke in each direction, and so bringing the pitman hard against the stop at the end of each stroke and thereby losing time in recovering and reversing the motion of the foot. Especially, operators who have been accustomed to the ordinary motion of an oscillating pedal connected by a pitman to a fly-wheel which, by its momentum, carries the pitman past the center and initiates the return stroke of the pitman and gives the operator a signal of such return movement to which he becomes accustomed and adapts his foot movement, would find it very difficult to acquire the action of this device,—in which the rotation of the wheel does not tend to reverse the movement of the pitman, and does not give any signal for such reverse movement,—unless there were provided some substitute for the movement of the fly-wheel in automatically reversing the stroke of the pitman at each limit and in giving the operator the signal for reversing his foot movement. In order to supply this deficiency I provide yielding stops for the strokes of the pitman in the shape of springs $H^2$ secured to the pitman in position to collide with the drums respectively just before the limit of the stroke, and to be put under tension while the stroke continues to the limit, and by their reaction, to initiate the reverse movement of the pitman. When these springs are made in the form illustrated, which is a partial spiral of flat spring metal secured at one end to the pitman and having the spiral at the other end overhanging the drum, (reference being had to the spring at the upper end of the pitman) the free end of the spiral which is covered with a piece of rubber $H^{20}$ to prevent noise when the spring strikes the drum, is frictionally engaged with the drum upon such contact, and while the downward motion of the pitman still continues and the rotary motion of the drum also continues, this engagement, tending to carry the end of the spiral inward, coils it somewhat, and thereby, in addition to the mere compression of the spiral caused by the downward motion, stores up the necessary energy to initiate the return movement. If the spring were of such nature as only to yield upward when the downward movement is arrested by a collision with the drum, the friction of the stop with the periphery of the drum, tending to arrest the rotary motion of the latter, would tend to check the downward movement of the pitman without storing up any energy to assist the return, and would, to that extent, defeat the purpose of the spring; the form adopted, therefore, is preferred when the stoppage is effected by collision with the rotating drum. The storage of energy thus effected tending to reverse the stroke, gives to the operator the same sensation as that to which he is accustomed in operating the pedal connected to a fly-wheel whose momentum initiates the return stroke. The pedal movement for this device is therefore natural and easily acquired. The momentum of the pedal itself will tend to carry the pitman practically to the end of its stroke against the resistance of the spring stop, even though the operator ceases the pressure, as he is accustomed to do in the ordinary pedal movement, a little before the end of the stroke.

Since the momentum of the drive wheel does not in any manner assist the action of the devices which drive it, and since the machines to which this device is intended to be applied usually have a balance wheel of their own, I prefer to make the wheel C as light as possible to the end that its momentum may be the least possible, so that it may be started and stopped most easily, and for that reason I prefer to make it after the manner of tension wheels for cycles with light wire spokes and a pressed metal or other light rim, and in this form it is illustrated.

I claim—

1. The drive wheel and the mechanism which drives it, comprising drums or sheaves clutched to their shafts, respectively, the pitman, and the cables which connect it to the drums, combined with elastically yielding stops for the pitman to yieldingly check its movement before the limits of its stroke in each direction: substantially as set forth.

2. The drive wheel, the mechanism which drives it, comprising drums or sheaves clutched to their driving shafts, respectively, the pitman, and the cables which connect it to the drums in combination with elastically yielding stops on the pitman adapted to collide with the drums to check the stroke of the pitman before its proper limits in each direction: substantially as set forth.

3. In combination with the drive wheel and the mechanism which drives it, comprising drums or sheaves clutched to their driving shafts, respectively, the pitman, and the cables which connect it to the drums; the spirally coiled spring stops $H^2$ attached to the pitman at the opposite ends and adapted to collide with the drums respectively before the limits of the strokes respectively, whereby both the rotation of the drums after the collision and the longitudinal movement of the pitman after the collision tend to put the colliding spring under tension, whose reaction will initiate the return stroke: substantially as set forth.

4. In combination, substantially as set forth, the drive wheel and its shaft and the clutch drum thereon; the shaft $f$ and the clutch drum thereon; the pulleys on said shafts respectively and the belt which encompasses them; the frame which encompasses both said shafts and affords bearings for them at their ends outside of all the wheels on them respectively, and the pitman reciprocating between the plane of the fly-wheel and the plane of the pulleys, and also between the drums: substantially as set forth.

In testimony whereof I have hereunto set my hand, at Chicago, Illinois, in the presence of two witnesses, this 24th day of April, 1894.

THADDEUS BAKER.

Witnesses:
JAS. H. BAKER,
CHAS. S. BURTON.